United States Patent [19]
Blonder

[11] Patent Number: 5,239,521
[45] Date of Patent: Aug. 24, 1993

[54] WRIST TELEPHONE

[75] Inventor: Greg E. Blonder, Summit, N.J.

[73] Assignee: AT&T Bell Laboratories, Murray Hill, N.J.

[21] Appl. No.: 891,359

[22] Filed: May 29, 1992

[51] Int. Cl.$^5$ .............................................. G04B 37/00
[52] U.S. Cl. ...................................... 368/10; 368/282
[58] Field of Search ............................... 379/428, 430; 368/280–282, 10, 13, 278

[56] References Cited

U.S. PATENT DOCUMENTS

| | | | |
|---|---|---|---|
| 4,754,285 | 6/1988 | Robitaille | 343/718 |
| 4,847,818 | 7/1989 | Olsen | 368/10 |
| 5,008,864 | 4/1991 | Yoshitake | 368/10 |

Primary Examiner—Bernard Roskoski
Attorney, Agent, or Firm—Eileen D. Ferguson; Glen E. Books

[57] ABSTRACT

A portable radio telephone device which is in the form of a wristwatch which is fastened to the user's wrist via a strap. The telephone device is comprised of two main components, a case and a strap. The case has a display and a transceiver. The strap or band has at least a top and a bottom layer which are attached to the case. The top layer of the band is releasable in the proximity where the case and strap meet. However, the top layer remains connected to the bottom layer of the strap by a pivotable hinge. The pivotable hinge is typically located opposite the case and permits the top layer to be rotated. The length of the top layer can be increased either by repositioning the case or having additional layers located beneath the top layer. The speaker is located on the end of the released top layer. The microphone is located on the band. When the top layer is released and rotated, the speaker is located in the palm of the user's hand and the microphone is positioned along the inside of the user's forearm. This design provides for a private telephone conversation without the removal of the telephone device from the user's wrist.

17 Claims, 4 Drawing Sheets

WRIST TELEPHONE

FIELD OF THE INVENTION

This invention relates to a portable radiotelephone device in the form of a wrist instrument.

BACKGROUND OF THE INVENTION

Recent progress in microelectronics has greatly miniaturized radio communication devices such as receivers, transmitters and antennas. This miniaturization has permitted the integration of these components into wrist-carried radio devices.

While a number of wrist telephone designs have been explored, none are completely satisfactory. In one design an antenna and loudspeaker are embedded in the wrist strap. The loudspeaker is used also as a microphone, but presumably not at the same time that it is used as a loudspeaker. This type of device, however, lacks privacy because the hearing device is the loud speaker and the volume of the device must be loud because the device is not located near the user's ear. In addition, the battery required to operate the speaker is quite bulky. In another wrist radio device the microphone and speaker are located at the ends of the wrist strap. To use this device, however, the user must remove the device from his wrist and hold one end of the strap in front of his mouth and the other end near his ear. The microphone and speaker must be sufficiently spaced apart to avoid feedback between the components. Another drawback of this device is the tendency to put it down and leave it behind. Yet a third design comprises a wristwatch radio receiver with a receptacle embedded in one strap end for receiving a connection jack for an earphone. However, a separate attachment is needed for the earphone, and this attachment is likely to be lost or misplaced.

Thus there is a need for a practical wrist radiotelephone which can be easily carried on the person, which can permit private conversation, and which is free of easily lost components.

SUMMARY OF THE INVENTION

The present invention is a wrist radiotelephone device which is fastened to a user's wrist via a strap. The telephone device is comprised of a case having a display, transceiver and battery therein. The strap, which is attached to the sides of the case, has at least two layers, a top and a bottom layer. Embedded within the strap are a microphone and a speaker which are connected via conductors to the transceiver located in the case. The antenna may be located in the strap or the case of the device. The speaker is located on the end of the top layer of the strap, and the microphone is located on either the bottom layer of the strap or the end of the top layer opposite from the speaker. The top layer separates from the bottom layer in the area where the strap is attached to the case. The length of the top layer can be increased either by positioning the case in a nonstandard position such as on the side of the user's wrist or by providing additional layers of folded strap to telescope out when the top layer is released. The top layer of the strap remains attached to the bottom layer via a hinge which also permits the top layer to rotate. The hinge is usually located at a point opposite the case. The released top layer rotates such that the speaker is located in the palm of the user's hand and the microphone is located along the inside of the user's forearm.

Positioning the speaker in the palm of the user's hand and the microphone along the inside of the user's forearm permits the hand to be placed over the speaker and the user's ear to cut out background noise and the microphone naturally falls near the user's mouth. This design provides a private telephone conversation without removal of the telephone device from the user's wrist. Additionally, the device can be used as a watch, pager or bracelet when not being used as a telephone.

DETAILED DESCRIPTION

Figure 1:
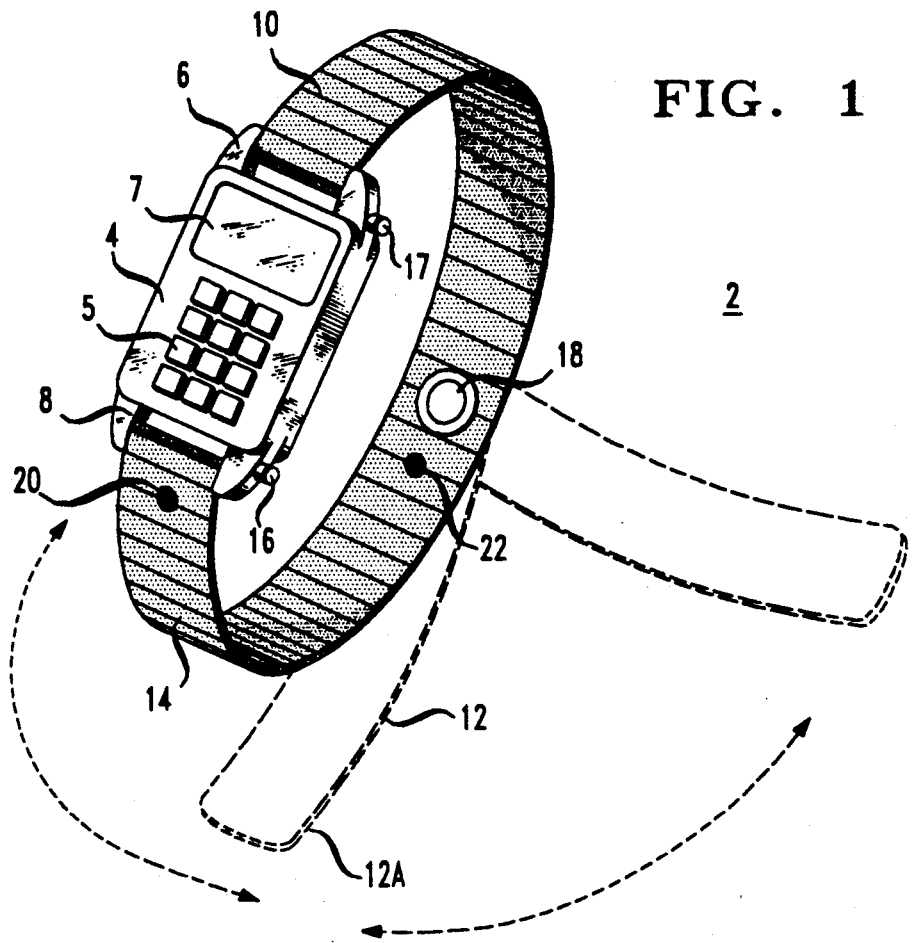
FIG. 1 is a perspective view of a first embodiment of a wrist telephone device in accordance with the invention.

Referring to the drawings, FIG. 1 shows a wrist radiotelephone 2. The telephone 2 is comprised of two main parts, a telephone case 4, and a multilayer strap or band 10. The strap 10 is attached to the case 4 and holds the case 4 onto the wrist of a user. The case 4 contains a conventional miniaturized transceiver (not shown) designed to provide two-way mobile telephone communications, a means for initiating a telephone call with a keyboard 5 or voice recognition device (not shown), a display 7 and a power supply such as a battery (not shown). Timekeeping, alarm or pager circuitry can also be incorporated into the case 4.

The case 4 is attached to the band by any number of ways. The two most common are mounting the case 4 onto the strap 10 or fastening the strap 10 to the upper and lower sides 6 and 8 of the case 4 as shown in FIG. 1. A clasping means 17 such as a button or lever is located on the sides 6 or 8 of the case 4 and/or strap 10 which enables the strap 10 to be released from the case 4. The clasping means 17 also enables the size of the strap 10 to be adjusted so that the device 2 fits over a user's hand and can be fastened to a user's wrist. A safety strap (not shown) can also be attached to the case 4 and strap 10 to help prevent loss of the device 2. The strap 10 has a least two layers, a top layer 12 which is the outer layer and a bottom layer 14 which is in contact with a user's wrist.

A releasing means 16 such as a bottom or lever is located on the side of the case 4 and/or strap 10. When the releasing means 16 is activated, the top layer 12 detaches from the bottom layer 14 in the area of the band 10 that is in close proximity to the upper side 6 or lower side 8 of the case 4. The top layer 12 remains attached to the bottom layer 14 via a pivotable hinge 18 which is typically located opposite the case 4. When the top layer 12 is released, the pivotable hinge 18 permits the top layer 12 to rotate approximately ±90° for left or right hand use. Rotation of the top layer 12 is typically towards the user's hand so that the released top layer 12 is perpendicular to the strap 10 and located in the palm of the user's hand, as shown in FIG. 2.

Figure 2:
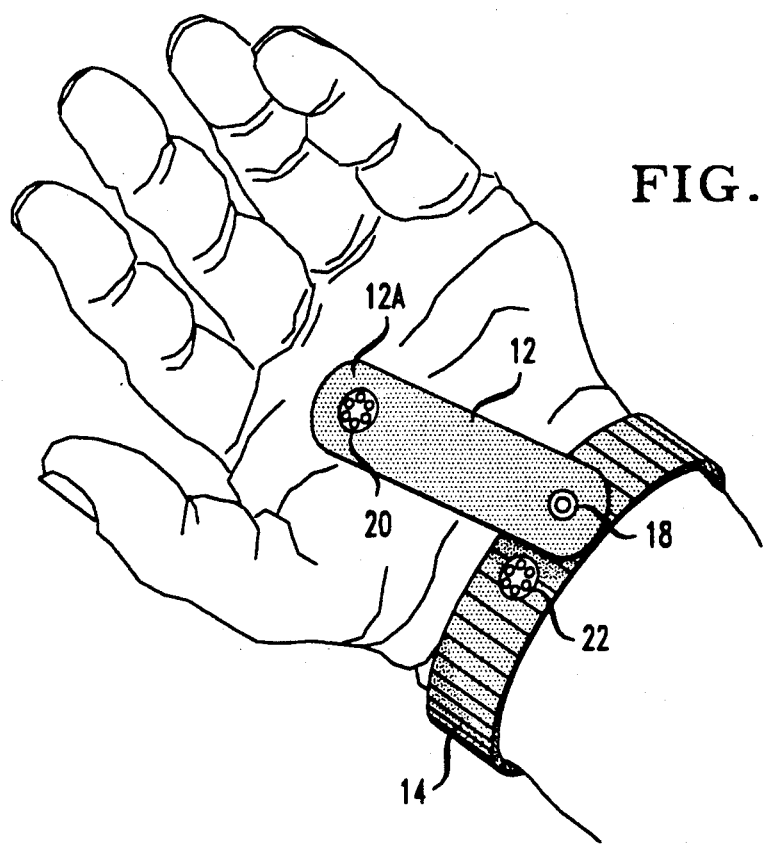
FIG. 2 is a perspective view of the wrist telephone device with the top layer of the strap in the released and open position.

As shown in FIG. 2, the speaker 20 is located on the unfastened end of the released layer 12A. The microphone 22 is located either on the top surface of the bottom layer 14 in close proximity with the hinge 18 or on the top layer 12 incorporated into the hinge 18. Rotation of the top layer 12 places the speaker 20 in the palm of the user's hand and uncovers the microphone 22 which is positioned along the inside of the user's forearm. The speaker 20 and microphone 22 are connected to the transceiver via separate pairs of conductors (not shown) embedded in the strap 10.

Figure 3:
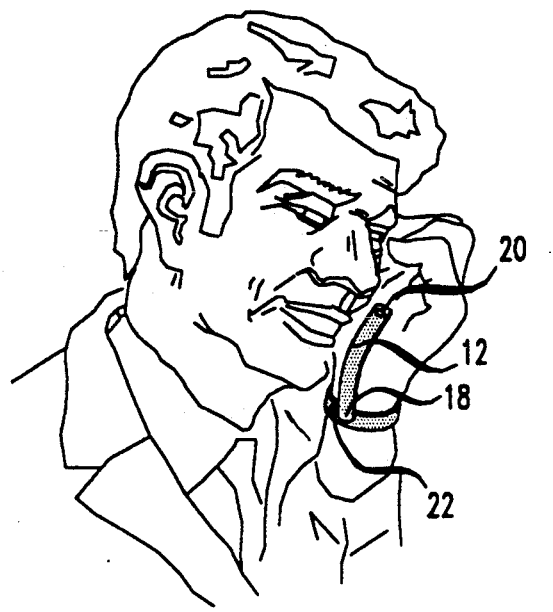
FIG. 3 is a simplified drawing of the wrist telephone device of FIG. 1 when it is being used as a telephone.

When the top layer 12 is released and rotated, the device 2 is in the open position which causes the device 2 to be "off" hook, placing or receiving a call. In the open position, a user simply places the palm of their hand over their ear to use the device 2. Placing the speaker 20 in the palm of the user's hand and the microphone 22 along the inside of the user's forearm creates a private environment in which the user can have a conversation. Additionally, the device 2 does not have to be removed from the user's wrist to be used and the rotation of layer 12 does not interfere with shirt or coat cuffs. FIG. 3 shows the telephone device 2 before the hand and speaker 20 are brought to cover the user's ear. When the top layer 12 is attached, the device is in closed position and the device 2 is "on" hook. In the closed position the device can be used as a watch, alarm, pager or bracelet. In this mode the speaker 20 can be used to provide a conventional radio alarm signal for an alarm watch, or the device can be programmed to receive and send paging signals.

Figure 4:
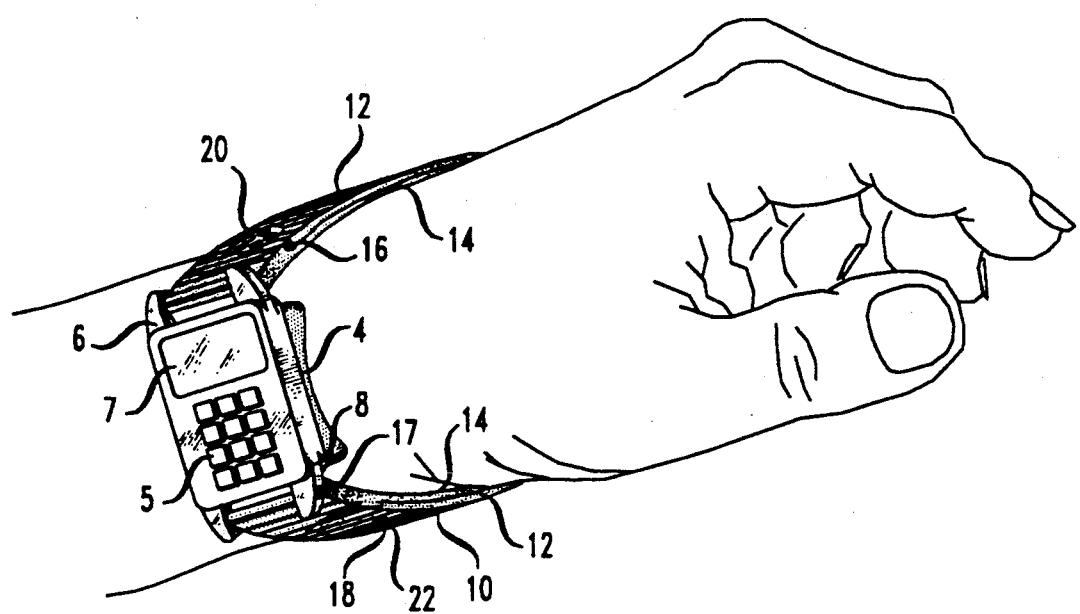
FIG. 4 is an elevational view of a modified wrist telephone device.

Increasing the length of the released layer 12 is accomplished by placing the case 4 in a nonstandard position along the side of the user's wrist, and having the hinge 18 remain in the location as shown in FIG. 4. In this position, the speaker 20 is located further up in the palm of the user's hand and closer to the user's ear when band 12 is released and rotated. To increase the comfort of this nonstandard position of the case 4, the bottom of the case 4 has the shape of a saddle, which fits around the side of the user's wrist. Additionally, this nonstandard position of the case 4 is easy to read and keeps the face of the case from scratching.

Figure 5:
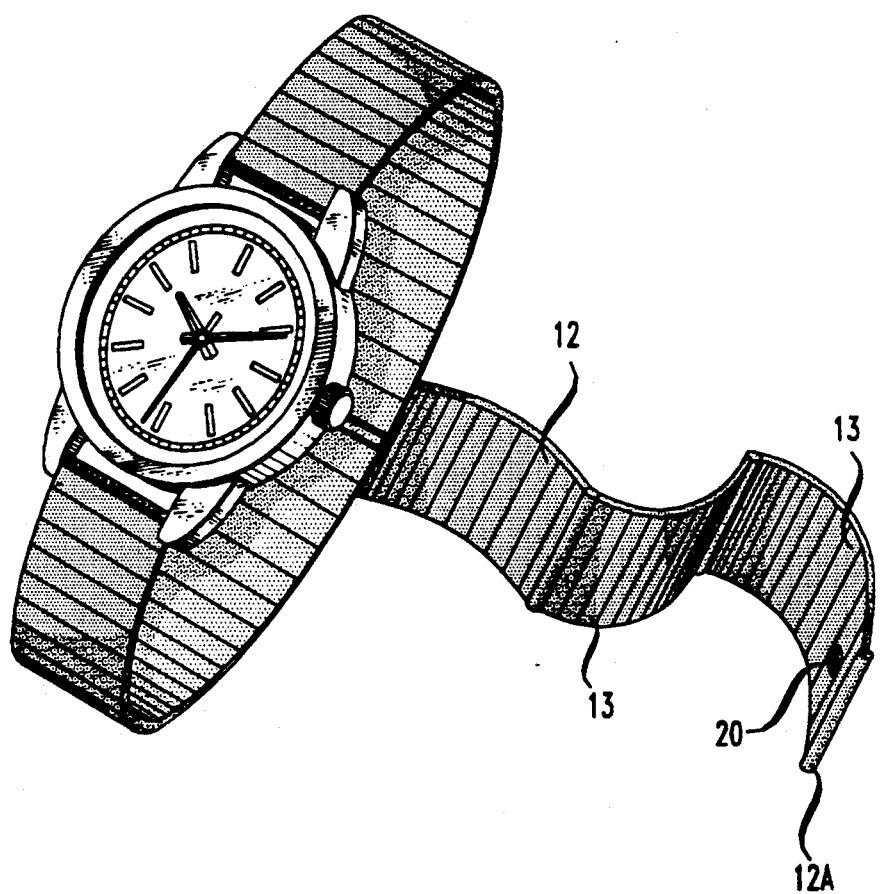
FIG. 5 is a perspective view of the wrist telephone with a telescoping top layer.

An alternative to repositioning the case 4 is to provide additional layers 13 which are serially connected to the top layer 12 folded underneath the top layer 12. When the top layer 12 is released the additional layers 13 telescope out as shown in FIG. 5, placing the speaker 20 closer to the user's ear.

Figure 6:
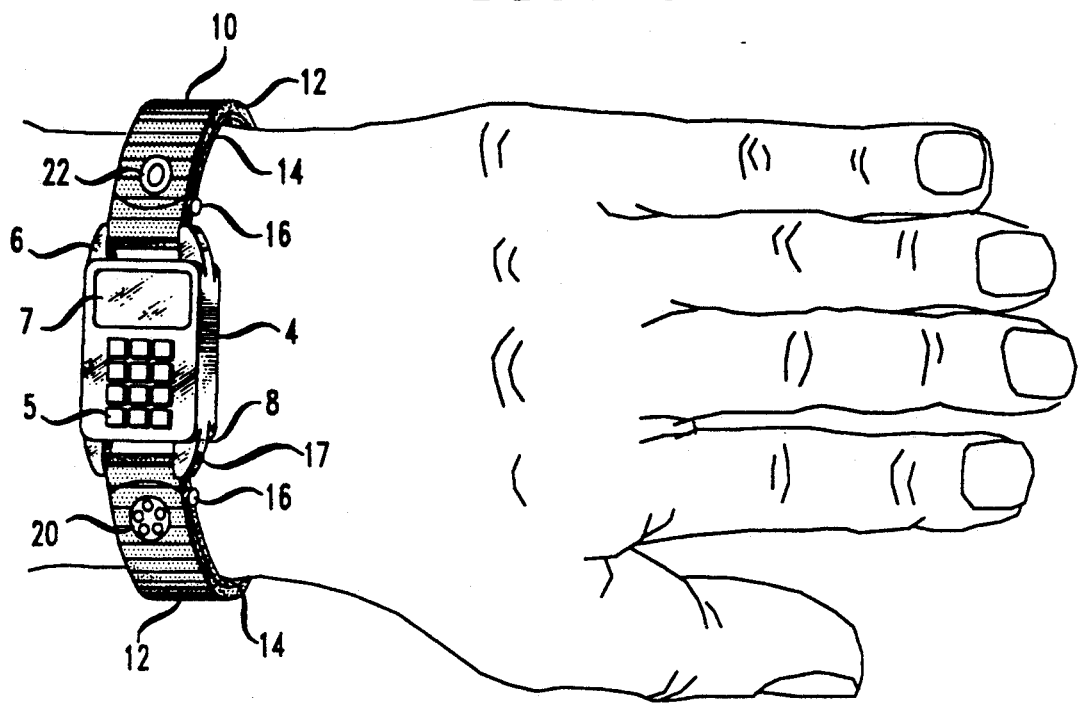
FIG. 6 is an elevational view of another embodiment of the wrist telephone device in the closed position.
Figure 7:
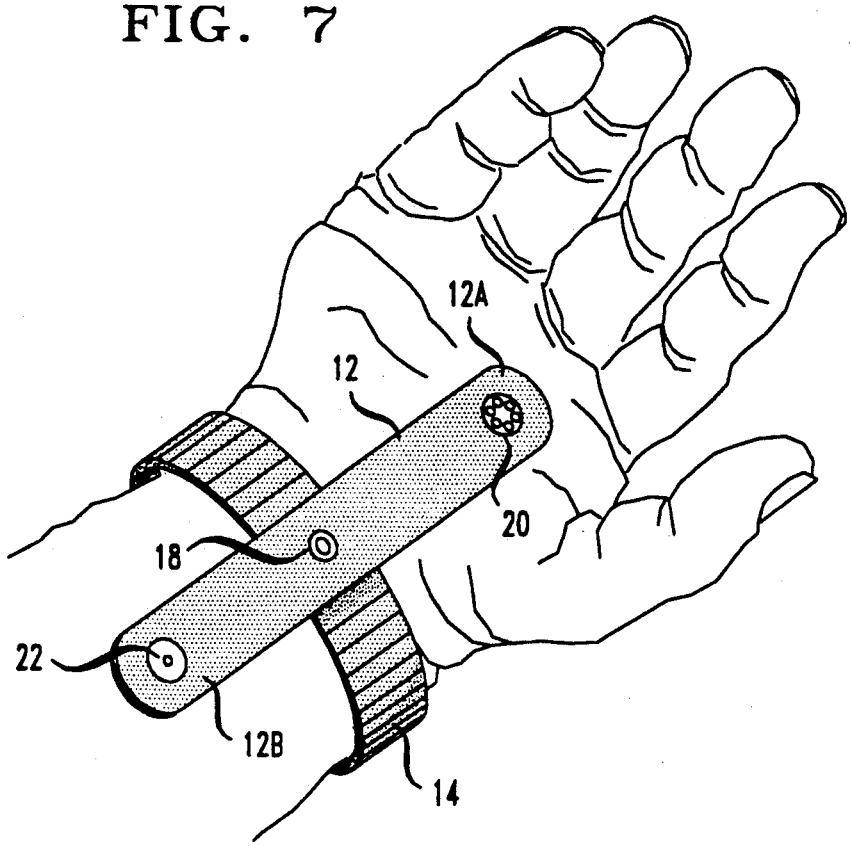
FIG. 7 is a perspective view of the wrist telephone device with the top layer of the strap in the open position.

FIGS. 6 and 7 illustrate another embodiment of the invention, wherein both the speaker 20 and the microphone 22 are located on the released layer 12. In this embodiment, the the strap 10 has at least two layers, a top layer 12 and a bottom layer 14. However the top layer 12 releases from both the upper 6 and lower 8 sides of the case 4 in the area where the strap 10 attaches to the case 4. When the release means 16 is activated, the top layer 12 releases from the bottom layer 14. The released top layer 12 remains connected to the bottom layer 14 by a pivotal hinge 18, typically located opposite the case 4. The speaker 20 and microphone 22 are located on opposing ends 12a and 12b of the top layer 12. The released top layer 12 is rotated approximately 90° so that the speaker 20 is located in the palm of the user's hand and the microphone 22 is located along the inside of the user's forearm. The length of the top layer 12 can be increased in the same manner as described above.

The strap 10 is made of materials that are relatively stiff so that when the top layer 12 of the strap 10 is released and rotated, the top layer 12 will remain in an "up" position. At the same time, the top layer 12 must be flexible and deformable enough to be attached around a wrist. Stiffness may be accomplished by using a spring material for the conductors which are inside the strap or by including a layer of stiff plastic.

Although the present invention has been described in connection with radio frequency, it is to be understood that the device is equally useful with infrared and other transmission facilities. Applications and modifications which are apparent to those skilled in the art are included within the scope and spirit of this invention.

I claim:

1. A radiotelephone wrist instrument comprising:
   a case with a transceiver disposed therein;
   a band attached to said case for fastening to a user's wrist comprising a top and bottom layer, said layer being attached to said bottom layer by means that comprise pivot means that facilitate rotating at least a portion of said top layer with respect to said bottom layer;
   a loudspeaker connected to said transceiver located in or on said top layer of said band; and
   a microphone connected to said transceiver.

2. A radiotelephone wrist instrument according to claim 1, further comprising release means for releasing the top layer of said band from the bottom layer of said band.

3. A radiotelephone wrist instrument according to claim 1, wherein said top layer releases from said bottom layer in close proximity to said case.

4. A radiotelephone wrist instrument according to claim 3, wherein said pivotable connection is diametrically opposite said case and enables said top layer to rotate when released from said bottom layer.

5. A radiotelephone wrist instrument according to claim 1, comprising additional underlying layers for telescoping out to increase the length of said top layer.

6. A radiotelephone wrist instrument according to claim 3, wherein said microphone is positioned on the top surface of said bottom layer near said pivotable connection.

7. A radiotelephone wrist instrument according to claim 3, wherein said microphone is incorporated into said pivotable connection.

8. A radiotelphone wrist instrument according to claim 1, wherein said top layer has a first release section located on one side of said case and a second release section located on the other side of said case and wherein said sections are separated by a pivotable connection.

9. A radiotelephone wrist instrument according to claim 8, wherein said microphone is positioned on the end of the first release section of said top layer and said speaker is positioned on the end of the second release section of said top layer.

10. A radiotelephone wrist instrument according to claim 8, wherein said pivotable connection is disposed approximately in the middle of the top layer and permits said top layer to rotate when released from said bottom layer.

11. A radiotelephone wrist instrument according to claim 1, wherein said case is attached to said band such that the case is positioned on the side of a user's wrist and the top layer of said band is nearly as long as said bottom layer.

12. A radiotelephone wrist instrument according to claim 11, wherein said top layer releases from said bottom layer in close proximity to said case and said top layer remains attached to said bottom layer by a pivotable connection.

13. A radiotelephone wrist instrument according to claim 11, wherein said speaker is located at one end of the top layer of said band, and said pivot near the other end.

14. A radiotelephone wrist instrument according to claim 11, wherein the bottom of said case is in the shape of a saddle.

15. A radiotelephone wrist instrument according to claim 12, wherein said pivotable connection is located on the top or bottom of a user's wrist.

16. A radiotelephone wrist instrument according to claim 12, wherein said microphone is positioned on the top surface of said bottom layer near said pivotable connection.

17. A radiotelephone wrist instrument according to claim 12, wherein said microphone is incorporated into said pivotable connection.

* * * * *

UNITED STATES PATENT AND TRADEMARK OFFICE
CERTIFICATE OF CORRECTION

PATENT NO. : 5,239,521
DATED : Aug. 24, 1993
INVENTOR(S) : Greg E. Blonder

It is certified that error appears in the above-indentified patent and that said Letters Patent is hereby corrected as shown below:

Column 4, line 24, after "said" insert --top--.

Signed and Sealed this

Eighth Day of March, 1994

Attest:

BRUCE LEHMAN

Attesting Officer    Commissioner of Patents and Trademarks